Feb. 7, 1961 B. GUERRERO Y OCAMPO 2,970,802
VALVE FOR WATER AND GAS LINES
Filed April 12, 1957
2 Sheets-Sheet 1
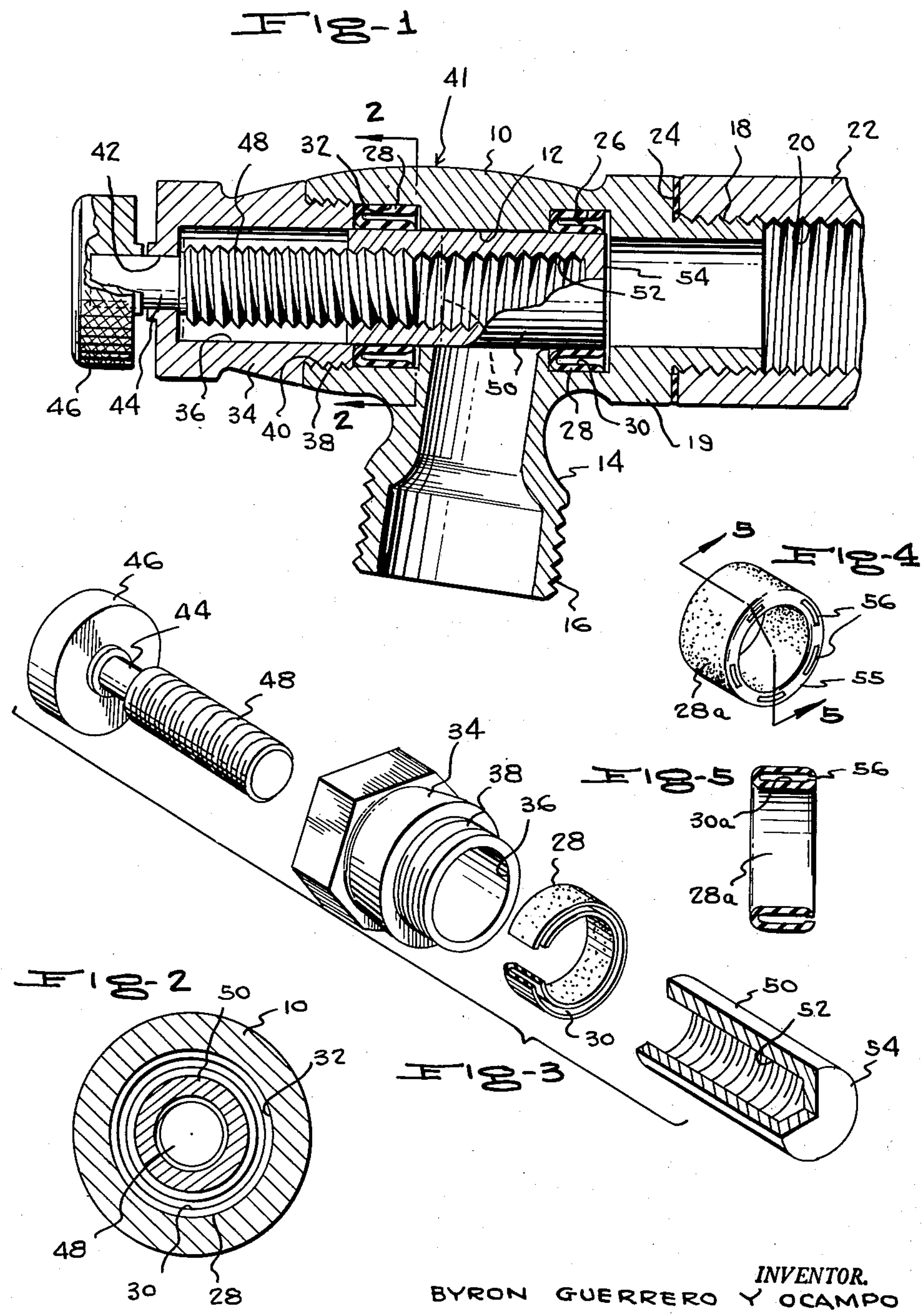
INVENTOR.
BYRON GUERRERO Y OCAMPO
BY
McMorrow, Berman + Davidson
ATTORNEYS Feb. 7, 1961
B. GUERRERO Y OCAMPO
2,970,802
VALVE FOR WATER AND GAS LINES
Filed April 12, 1957
2 Sheets-Sheet 2
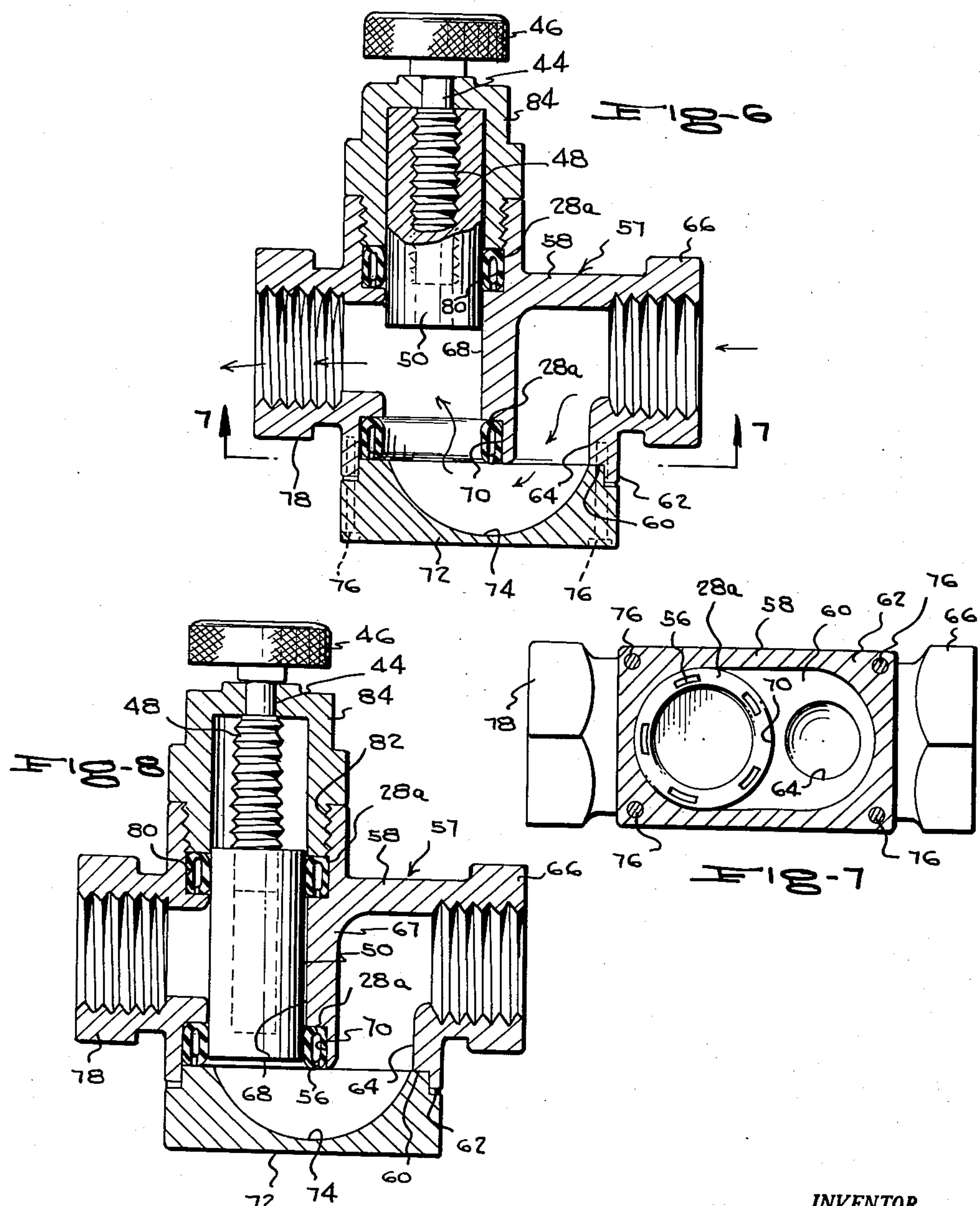
INVENTOR.
BYRON GUERRERO Y OCAMPO
BY
McMorrow, Berman + Davidson
ATTORNEYS United States Patent Office 2,970,802
Patented Feb. 7, 1961

1

2,970,802

VALVE FOR WATER AND GAS LINES

Byron Guerrero y Ocampo, Av. Curazao 653, Col. Lindavista, Mexico City 14, Mexico Filed Apr. 12, 1957, Ser. No. 652,551
4 Claims. (Cl. 251—172)

This invention relates to a valve particularly adapted for controlling flow through water or gas pipe lines of various diameters.

Heretofore, the valves most commonly used in the environments mentioned have included circular gaskets or washers arranged to shut off flow of liquid or gaseous fluids by compression of the gaskets against the smooth edges of orifices or valve seats.

Perfect closure of such valves is effected only responsive to forcible compression of the gasket. The gasket must thus be relatively soft, as a result of which the life of the gasket is comparatively short. Should a gasket of harder material be employed, longer life of the gasket is achieved only at the sacrifice of perfect closure of the valve.

Still further, when a conventional valve of the type described above is opened, the fluid tends to escape through the opening about the valve stem where the gland is located, in view of the fact that closure at this point also is imperfect due to the necessity of manufacturing the valve with an extremely tight packing. The tight packing results in forcing of the stem and after a period of time the gland becomes worn and leaks tend to develop.

In view of the difficulties which have heretofore persisted, one important object is to make the valve leak-proof while at the same time insuring perfect closure without accompanying dependence on pressure exerted on packing or on axially compressible circular gaskets of the type hereinbefore referred to.

Another important object is to relatively form and arrange the components of the valve in such a manner that the gaskets or packings will effect perfect seals, both in the open and closed valve positions, in direct response to the pressure of the fluid against the same.

Another object is to effect the desired sealing arrangement while reducing to a substantial degree the value of the force required for closing as compared to conventional valves already in use.

In accomplishing the above stated objects, the valve of the invention includes an axially shiftable cylinder having a threaded recess in engagement with a swiveled, threaded stem. Engaged in grooves spaced axially of a valve body are novelly designed gaskets in contact with the cylinder at opposite sides of the outlet of the valve, when the cylinder is in closed position. The gaskets effect their sealing action responsive to pressure exerted internally of the gaskets by the fluid, the flow of which is to be controlled by the valve. The employment of the particularly, novelly formed gaskets, and the particular arrangement of said gaskets relative to the remaining components of the device, achieve results not previously achieved in somewhat similar valves, in view of the fact that although the use of axially shiftable cylinders have been employed, so far as is known a sealing action has not been obtained through the use of a pressure applied internally of gaskets such as are employed in the present invention. Further, the construction is so designed as to eliminate another defect noted in connection with valves heretofore devised, in that the valve of the invention is so arranged that no threaded surface, at any time, comes in contact with the controlled fluid. In this way, the corrosive effects of said fluid, on threaded surfaces, are completely eliminated.

Other objects will appear from the following description, the claims appended thereto, and from the annexed drawing, in which like reference characters designate like parts throughout the several views, and wherein:

Figure 1 is a longitudinal sectional view through one form of valve constructed according to the present invention, the valve being in closed position;

Figure 2 is a transverse sectional view substantially on line 2—2 of Figure 1;

Figure 3 is an exploded perspective view, portions being shown in section, of the stem, cylinder, and cap assembly of the valve;

Figure 4 is a perspective view of a modified form of sealing gasket;

Figure 5 is a sectional view, on a slightly enlarged scale, substantially on line 5—5 of Figure 4;

Figure 6 is a sectional view longitudinally through a modified form of valve intended particularly for employment intermediate the ends of a pipe line as distinguished from the first form which is intended for employment at the outlet of the line, the valve being in open position;

Figure 7 is a sectional view substantially on line 7—7 of Figure 6; and

Figure 8 is a view like Figure 6 in which the valve is closed.

In Figures 1–3, the valve includes an open-ended hollow, generally cylindrical valve body 10 having a smooth-walled axial bore 12. Integrally formed on and projecting laterally from the midlength portion of body 10 is an outlet member 14 which, at its free end, may be externally threaded as at 16 so that a hose or additional gas or water line may be connected thereto if desired.

The body 10 has an externally threaded extension 18, and at the base of the extension the body 10 is externally formed with a wrench-receiving, non-circular surface 19. Extension 18 is engageable in a threaded bore 20 of a gas or water line 22 to which the valve is to be connected. A conventional compressible gasket 24 may be interposed between the abutting ends of the valve body and pipe line 22, in the usual manner, with the wrench-receiving formation 19 being adapted to facilitate rotation of the valve body when the same is being connected to or disconnected from the pipe line.

Formed in the wall of bore 12, immediately adjacent and upstream from outlet member 14, is a wide, comparatively deep, continuous, circumferential recess 26 of the body, in which is removably, comparatively loosely engaged a gasket 28 formed of a flexible, leak-preventive material having the shape of an endless band folded upon itself to define inner and outer band portions integrally, sealably connected along one edge and spaced apart completely along their other edges to permit fluid to flow into the open-sided cavity 30 defined in the band by the folded construction thereof. Recess 26 is substantially greater in width than the width of the band, so that the open side of the band is spaced from the adjacent side wall of the recess (Figure 1) a distance sufficient to permit fluid to pass into the recess and then into cavity 30, under pressure, to exert a pressure against the inner band portion tending to contract the same radially for a purpose to be made more clearly apparent hereinafter.

Immediately adjacent outlet member 14 at the other side thereof is an angular recess 32 holding a second gasket 28 the open side of which is faced in the same direction as the open side of the first described gasket 28, that is, upstream of the valve.

Forwardly of angular recess 32, the wall of bore 12 is threaded and counterbored as at 40. A cap 34 has an axial bore 36 communicating with bore 12 at the inner end of the cap, said inner end of the cap being formed with a reduced, internally threaded extension 38 engaging in the threaded end 40 of bore 12. The inner end surface of cap 34 defines a side wall of recess 32, so that said recess, when the cap and body are assembled, is identical to the recess 26. The cap 34 and the body 10 together constitute a housing for the valve, generally designated 41.

In the closed, outer end of cap 34, a smooth-walled center opening 42 rotatably receives the smooth-surfaced shank 44, that projects beyond the end wall of cap 34. A knurled head or knob 46 is connected to the projecting portion of shank 44 in any suitable manner, for rotation therewith.

Interiorly of the cap 34, shank 44 is integral with a threaded stem 48, which stem terminates at its other, inner end just short of the discharge or outlet member 14.

A cylinder 50 is externally smooth-surfaced, and has an axial bore 52 one end of which is open to receive the stem 48. Bore 52 is threaded, so that on rotation of the stem, cylinder 50 will be shifted in an axial direction from its closed position of Figure 1 to the left in this figure of the drawing, for the purpose of permitting flow of the fluid from the pipe line 22 through bore 12 and member 14. The other end of cylinder 50 is wholly closed by an end wall 54, so that under no circumstances can the fluid contact the threads either of the stem 48 or of the cylinder.

In the closed position of the cylinder, the opposite end portions of the cylinder move into slidable contact with the inner band portions of the respective gaskets 28 as shown in Figure 1. Further, the end wall 54 of the cylinder terminates short of the inner side wall of recess 26, so that when the cylinder 50 is in closed position, fluid will still be forced under pressure into recess 26, and into the cavity 30 so as to force the inner band portion of that gasket 28 shown at the right in Figure 1 radially inwardly to contract the same into tight, sealing engagement with the inner end portion of cylinder 50. As a result, a very effective seal is provided about the cylinder 50, upstream from the outlet of the valve, thus insuring against leakage when the valve is in closed position.

The cylinder 50 fits comparatively loosely in the bore 12, so that it can be freely shifted in an axial direction with a minimum amount of effort and with no strain whatever on the threads. There is, however, a sufficient gripping of the cylinder 50 at all times by the gaskets, to insure that the cylinder 50 will be held against rotatable movement while the stem 48 is being turned, so that the desired axial shifting of the cylinder 50 will occur.

It will be apparent that the gaskets remain in place at all times, during the axial movement of the cylinder 50. When the cylinder 50 is moved to the left in Figure 1 to open position, it becomes wholly disengaged from the gasket 28 that is located at the right in the figure, upstream from member 14. In these circumstances, any fluid tending to flow about the cylinder 50 will now move into the recess 32, and will exert pressure internally of the gasket 28 shown at the left in Figure 1, tending to force the inner band portion thereof against the wall of the cylinder 50. Therefore, leakage of the fluid into the cap 34 and hence about the shank 44 is completely and effectively prevented.

Leakage thus is clearly and completely prevented in both the open and closed positions of the valve. In this connection, it will be apparent that the fluid does not touch any threaded surface of the valve, and therefore the deposits or corrosion that ordinarily tend to damage the threads of valves, when said threads are exposed to the fluid, are completely precluded.

It will further be noted that in the event it is necessary to replace the gaskets 28, this is achieved without the necessity of removing various screws, or disassembling relatively complicated parts. Heretofore, considerable time has been involved in the disassembly of the valve for the purpose of removing a gasket, in valves of the general type illustrated and described herein. This is eliminated in the present instance due to the fact that replacement of a gasket is achieved merely by threading cap 34 out of engagement with body 10, to permit removal of the cap, stem, and cylinder. This exposes both gaskets, so that they can be swiftly replaced.

In Figures 4 and 5, there is shown a slight modification of the gasket. The gasket illustrated in these figures of the drawing has been designated at **28*a*, and is basically similar in construction to the gasket 28, except that instead of being completely open at its inlet side, the gasket is closed at this side, by a wall 55 having uniformly spaced, circumferentially extending ports 56 communicating with the cavity 30*a* of the gasket. The operation is the same as with the gasket 28, that is, the fluid will pass through the ports 56 into the cavities 30*a*, so as to exert a pressure against the inner portion of the gasket tending to contract the same against cylinder 50**.

In Figures 6–8 there is illustrated a valve which is particularly adapted for location intermediate the ends of a pipe line, that is, the valve has its inlet and outlet ends coaxially aligned.

In this form, the valve housing generally designated 57 includes, as in the first form, a valve body 58 and a cap to be described hereinafter. Body 58 as shown in Figure 7 is in the illustrated example, but not necessarily, of rectangular outer configuration when viewed in cross section and at one end has a comparatively shallow recess 60 defining a peripheral flange 62 at this end of the body.

An inlet passage 64 is formed in one side of the body, with fluid flowing into said passage through an internally threaded inlet member 66, the outer surface of which is shaped to receive a wrench or similar tool as best shown in Figure 7.

Separated from passage 64 by a partition 67 is an outlet passage 68 of body 58, counterbored at its inlet end to provide a gasket-receiving recess 70.

Communication is provided between the inlet and outlet passages through the provision of an end plate 72 having an arcuate recess 74 formed in its inner surface in communication with passages 64, 68. At the corners of plate 72, smooth-walled openings are formed, receiving screws 76 (Figures 6 and 7) that threadedly engage in registering recesses formed in the body 58.

Communicating with passage 68, and aligned coaxially with the inlet member 66, is an internally threaded outlet member 78 also exteriorly formed for receiving a wrench or like tool.

There is thus defined a flow passage through the valve housing 57, which passage has an inlet and an outlet, and in which passage the cylinder 50 is axially shiftable, in the same manner as in the first form of the invention.

It will be noted that outside of the particular shape of the passage, the modified construction is similar, in respect to functional characteristics and the particular formation and relative arrangement of the components, to the first form. Thus, the gasket **28*a* disposed in recess 70 is located upstream from the outlet 78, immediately adjacent the outlet, and is in slidable contact with the inner end of cylinder 50 in the closed position of the cylinder. Similarly, an angular recess 80 is provided at the opposite side of outlet 78, receiving a second gasket 28*a*. It will be understood that gaskets 28 could be used in the modified form instead of gaskets 28*a*. Similarly, gaskets 28*a* could be used in the first form instead of gaskets 28**.

At the end of the body oppoosite that to which the plate 72 is secured, the body is formed with a projection internally threaded as at 82, to receive the complementarily threaded end portion of cap 84 the outer end of which has an end wall apertured for rotatably engaging shank 44 carrying stem 48 and secured exteriorly of the housing to knob 46.

It will thus be seen that on rotation of knob 46 in one direction, cylinder 50 will be shifted out of its closed position toward knob 46, thus opening the flow passage to permit fluid to pass from the inlet to the outlet. The cylinder has wiping contact with the respective gaskets which remain in place at all times, and as in the first form of the invention, the gaskets have their open sides faced upstream of the device, so as to permit fluid under pressure to enter the gaskets for the purpose of forcing the inner portions of the gaskets radially inwardly into sealing engagement with the cylinder 50.

As in the first form of the invention, all threaded parts that must be threadedly engaged with other parts are wholly out of contact with the fluid that passes through the valve. The stem 48 is thus never impinged upon by the fluid, and therefore remains free of deposits or corrosion. The same is true of the internal threads of the cylinder 50. Even the screws 76 in the second form are disposed wholly out of the path of the fluid flow.

Both forms of the invention have the common characteristic wherein the sealing action results from the pressure of the fluid, applied internally of the annular gaskets tending to inflate or expand the gaskets, thus compressing the same through their full circumferences against the cylinder, as well as against the walls of the recesses. In other words, not only is the inner portion of each gasket forced inwardly radially into contact with the cylinder, but also, the outer portion of each gasket is forced radially outwardly, or expanded, into sealing engagement with the wall of the associated recess.

Gases or liquids are thus wholly prevented from passing along the contact surfaces of the packings and valve housing, thus achieving a closure the sealing effect of which is substantially more effective than that of valves heretofore in use.

Thus, it will be seen that the natural elasticity of the material from which the packings are made is not the factor on which the sealing action depends. Rather, the sealing action results from the fluid pressure, applied internally of the gasket to inflate the same.

Still further, the application of pressure internally of the gaskets, by the fluid that flows through the valves, operating to expand one or both of the gaskets in both closed and open positions of the valve, has not previously been conceived, so far as is known. Then again, the arrangement wherein the gaskets may be swiftly removed for replacement whenever desired is believed to be novel in the illustrated embodiment of the invention. Where heretofore the replacement of gaskets has required, in many instances, as much as one-half hour or more in an ordinary valve, only a few minutes, at most, are required for replacing the gaskets of the present invention.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A valve assembly comprising a valve body having first and second ends and a smooth bore extending therein, an outlet opening into a side of said bore between the ends of the bore, one end of said bore being a fluid inlet at the second end of the valve body, said bore being indented at opposite sides of the inlet to provide first and second annular grooves having first and second side walls, actuating means extending through said first end of the body, a valve sliding in said bore and having first and second ends, the second end of the valve being closed, means operatively connecting said actuating means to the first end of the valve for moving the valve endwise in the bore, similar first and second annular gaskets severally confined in said first and second grooves and spaced from the second side walls of the grooves, said gaskets being resilient and having spaced outer and inner side walls defining chambers therebetween, and fluid entrance means communicating with the chambers, said grooves and said gaskets being spaced from each other at a distance to produce engagement of the gaskets with related end portions of the valve in the closed position of the valve, said valve in its closed position at said one end of the bore extending across and closing said outlet and having its closed end near to and spaced from the second side wall of the second groove to pass fluid from the inlet into the second groove and into the chamber of the second gasket for expanding the inner side wall of the second gasket against the surface of the valve, said valve in its open position at the first end of the valve body being disengaged from the second gasket and sealingly engaged by the first gasket.

2. A valve assembly comprising a valve body having first and second ends and a smooth bore extending therein, an outlet opening into a side of said bore between the ends of the bore, one end of said bore being a fluid inlet at the second end of the valve body, said bore being indented at opposite sides of the inlet to provide first and second annular grooves having first and second side walls, actuating means extending through said first end of the body, a valve sliding in said bore and having first and second ends, the second end of the valve being closed, means operatively connecting said actuating means to the first end of the valve for moving the valve endwise in the bore, similar first and second annular gaskets severally confined in said first and second grooves and spaced from the second side walls of the grooves, said gaskets being resilient and having spaced outer and inner side walls defining chambers therebetween, and fluid entrance means communicating with the chambers, said grooves and said gaskets being spaced from each other at a distance to produce engagement of the gaskets with related end portions of the valve in the closed position of the valve, said valve in its closed position at said one end of the bore extending across and closing said outlet and having its closed end near to and spaced from the second side wall of the second groove to pass fluid from the inlet into the second groove and into the chamber of the second gasket for expanding the inner side wall of the second gasket against the surface of the valve, said valve in its open position at the first end of the valve body being disengaged from the second gasket and sealingly engaged by the first gasket, said gaskets being U-shaped in cross section and having externally rounded bight portions engaged with the first side walls of the grooves, said outer and inner side walls being on said bight portions and having unconnected free edges spaced from the second side walls of the grooves and defining said fluid entrance means.

3. A valve assembly comprising a valve body having first and second ends and a smooth bore extending therein, an outlet opening into a side of said bore between the ends of the bore, one end of said bore being a fluid inlet at the second end of the valve body, said bore being indented at opposite sides of the inlet to provide first and second annular grooves having first and second side walls, actuating means extending through said first end of the body, a valve sliding in said bore and having first and second ends, the second end of the valve being closed, means operatively connecting said actuating means to the first end of the valve for moving the valve endwise in the bore, similar first and second annular gaskets severally confined in said first and second grooves and spaced from the second side walls of the grooves, said gaskets being resilient and having spaced outer and inner side walls defining chambers therebetween, and fluid entrance means communicating with the chambers, said grooves and said gaskets being spaced from each other at a distance to produce engagement of the gaskets with related end portions of the valve in the closed position of the valve, said valve in its closed position at said one end of the bore extending across and closing said outlet and having its closed end near to and spaced from the second side wall of the second groove to pass fluid from the inlet into the second groove and into the chamber of the second gasket for expanding the inner side wall of the second gasket against the surface of the valve, said valve in its open position at the first end of the valve body being disengaged from the second gasket and sealingly engaged by the first gasket, said gaskets being of flat tubular form wherein the outer and inner gasket side walls are connected and spaced by first and second edge walls extending around the gaskets, the second edge walls being spaced from the second side walls of the grooves and having circumferentially spaced openings therein defining said fluid entrance means.

4. A valve assembly comprising a valve body having first and second ends and a smooth bore extending therein, an outlet opening into a side of said bore between the ends of the bore, one end of said bore being a fluid inlet at the second end of the valve body, said bore being indented at opposite sides of the inlet to provide first and second annular grooves having first and second side walls, actuating means extending through said first end of the body, a valve sliding in said bore and having first and second ends, the second end of the valve being closed, means operatively connecting said actuating means to the first end of the valve for moving the valve endwise in the bore, similar first and second annular gaskets severally confined in said first and second grooves and spaced from the second side walls of the grooves, said gaskets being resilient and having spaced outer and inner side walls defining chambers therebetween, and fluid entrance means communicating with the chambers, said grooves and said gaskets being spaced from each other at a distance to produce engagement of the gaskets with related end portions of the valve in the closed position of the valve, said valve in its closed position at said one end of the bore extending across and closing said outlet and having its closed end near to and spaced from the second side wall of the second groove to pass fluid from the inlet into the second groove and into the chamber of the second gasket for expanding the inner side wall of the second gasket against the surface of the valve, said valve in its open position at the first end of the valve body being disengaged from the second gasket and sealingly engaged by the first gasket, said gaskets being of flat tubular form wherein the outer and inner gasket side walls are connected and spaced by first and second edge walls extending around the gaskets, the second edge walls being spaced from the second side walls of the grooves and having circumferentially spaced openings therein defining said fluid entrance means, said edge walls being externally rounded.

References Cited in the file of this patent

UNITED STATES PATENTS

| | | |
|---|---|---|
| 679,005 | Prouty | July 23, 1901 |
| 1,890,836 | Webb | Dec. 13, 1932 |
| 1,954,018 | Miller | Apr. 10, 1934 |
| 2,268,020 | Dahlstrom | Dec. 30, 1941 |
| 2,303,392 | Scaramucci | Dec. 1, 1942 |
| 2,360,733 | Smith | Oct. 17, 1944 |
| 2,509,656 | Tomoser | May 30, 1950 |
| 2,602,592 | Tomoser | July 8, 1952 |
| 2,731,031 | Newhouse | Jan. 17, 1956 |
| 2,856,961 | Kruschik | Oct. 21, 1958 |

FOREIGN PATENTS

| | | |
|---|---|---|
| 489,834 | France | Nov. 5, 1918 |
| 717,241 | Great Britain | Oct. 27, 1954 |